United States Patent [19]

Thompson

[11] 4,362,541

[45] Dec. 7, 1982

[54] METHOD AND APPARATUS FOR PRODUCING GLASS FIBERS OR FILAMENTS

[75] Inventor: Thomas K. Thompson, Granville, Ohio

[73] Assignee: Owens-Corning Fiberglas Corporation, Toledo, Ohio

[21] Appl. No.: 258,205

[22] Filed: Apr. 27, 1981

[51] Int. Cl.$^3$ .................................... C03B 37/025
[52] U.S. Cl. .............................. 65/2; 65/12; 239/587
[58] Field of Search .............. 137/355.16, 355.17; 239/587, 280.5; 65/2, 10.1, 12

[56] References Cited

U.S. PATENT DOCUMENTS

| | | | |
|---|---|---|---|
| 3,986,853 | 10/1976 | Coggin | 65/2 |
| 4,149,865 | 4/1979 | Coggin | 65/1 |
| 4,159,200 | 6/1979 | Shono et al. | 65/12 |
| 4,171,212 | 10/1979 | Shono et al. | 66/10.1 |
| 4,202,680 | 5/1980 | Thompson | 65/12 |
| 4,222,757 | 9/1980 | Glaser et al. | 65/2 |
| 4,229,198 | 10/1980 | Coggin et al. | 65/10.1 |

Primary Examiner—Robert L. Lindsay, Jr.
Attorney, Agent, or Firm—Ronald C. Hudgens; Philip R. Cloutier; Harry O. Ernsberger

[57] ABSTRACT

The disclosure embraces a method of and apparatus for controlling or stabilizing the temperature or heat pattern at an orifice plate or feeder floor from which flow glass streams which are attenuated to fibers or filaments. More particularly the disclosure embraces a method of and apparatus for delivering streams of air or other fluid from a nozzle construction at a selected angular position into the attenuating environment and onto the feeder floor or orifice plate for cooling the glass streams and the feeder floor or orifice plate for normal attenuating operations. In event of a fiber or filament break-out or other interruption of attenuation, the angularity of the nozzle construction is changed with respect to the normal path of movement of the fibers or filaments so as to stabilize the heat pattern at the orifice plate or feeder floor and thereby facilitate restarting of normal attenuating operations.

24 Claims, 6 Drawing Figures

FIG. 1

FIG. 2

METHOD AND APPARATUS FOR PRODUCING GLASS FIBERS OR FILAMENTS

TECHNICAL FIELD

This invention relates to a method of and apparatus for flowing streams of glass from a feeder which are attenuated to fine continuous fibers or filaments, the invention including improvements in the method and apparatus for stabilizing the temperature at the glass stream flow region during attenuating operations and during interruption of normal attenuating operations.

BACKGROUND ART

It has been conventional practice in forming glass fibers or filaments by attenuating streams of heat-softened glass flowing from a stream feeder or bushing having depending orifice projections through which streams of glass are flowed and are attenuated to continuous fibers or filaments by winding a strand or linear group of the fibers or filaments into a wound package. In the use of a stream feeder or bushing having rows of depending tips or projections provided with stream flow orifices, the projections have been spaced sufficiently to accommodate metal fin shields for conveying away heat from the glass streams to thereby render the glass in a more viscous condition for attenuation of the glass streams to fine fibers or filaments.

Endeavors have been made to increase the production of fibers by using an orifice plate or floor of a feeder or bushing having very short orificed projections or using a tipless plate or tipless bushing floor having orifices formed therein. As such orifice plate or bushing floor has considerably more stream flow orifices to attain increased production of fibers or filaments, the orifices are closely spaced so that there is insufficient space to accommodate metal fin shields.

There has been considerable activity in the glass fiber or filament-forming field to develop a process and apparatus for controlling the fiber-forming environment wherein the glass streams flow through closely spaced orifices in a flat plate or tipless bushing floor or an orifice plate or bushing having closely spaced, very short depending orificed projections.

Developments in this field include the use of a nozzle construction positioned below the orifice plate or bushing floor from which an upwardly directed flow of air impinges on the orifice plate or orificed bushing floor. The impingement of cooling air upwardly onto the orifice plate or bushing floor cools the molten glass flowing from the orifices to maintain fiber separation and to eliminate any stagnant air or gas at the under surface of the orifice plate or bushing floor.

Difficulties have been encountered in maintaining a stable glass fiber-forming environment utilizing gas or air flow from a nozzle construction. Difficulties can also arise in restarting fiber or filament-forming operations after there has been an interruption of attenuation or filament break-out in a process using a feeder having very short depending orifice projections or in the restarting of filament-forming operations utilizing a tipless orifice plate or bushing floor.

Restarting filament-forming operations from a tipless bushing is particularly difficult because a tipless bushing does not form beads of glass at the orifices as does an orifice plate or bushing floor having conventional depending projections. Restarting attenuating operations in the process require a highly skilled operator and restarting operations are time consuming.

DISCLOSURE OF THE INVENTION

The present invention pertains to a method of and apparatus for stabilizing and controlling the glass stream flow environment of a glass fiber-forming operation wherein streams of glass are flowed through orifices in an orifice plate or orifices in a bushing floor wherein the streams of glass are attenuated to continuous fibers or filaments.

The method and apparatus involve delivering air or other gas from a nozzle construction mounted below an orifice plate or bushing floor, the nozzle construction delivering air at a velocity effective to cool or chill the glass flowing from the orifices to a viscous condition so that the glass may be attenuated to continuous fine filaments by winding a strand of the filaments into a package on a winding machine.

The invention involves a nozzle construction in which a group of outlets or nozzles is arranged to be adjusted or indexed in the manner such that the exit regions of the nozzles are maintained in a substantially constant position with respect to the orifice plate or bushing floor to attain a proper heat environment or pattern at the stream flow region of the orifice plate or bushing floor.

The angular position of the nozzles of the nozzle construction may be indexed or varied depending upon the sizes or diameters of the filaments being formed and the speed of linear attenuation of the filaments. The filaments are converged into a strand whereby the filaments prior to their convergence are in a fan-like pattern which is usually referred to as a silver fan or filaments.

When a filament break-out occurs and attenuation is interrupted, the weight or mass of the glass of the hanging streams is in the form of coarse heavy filaments from the glass streams falling by gravity so that the heavy sliver of gravity-attenuated filaments is left hanging from the orifice plate or bushing floor.

With the air nozzle in the more vertical position and the winding of the package interrupted, either upon completion of a package or the occurrence of a filament break-out, there is inadequate air penetration through the heavy sliver fan during the hanging condition. With the nozzles in the more nearly vertical position, the rear area of the bushing floor or orifice plate is overcooled and the front area becomes very hot.

By indexing or adjusting the angularity of the nozzle construction to a greater degree of angularity from the vertical, the air flow reaches the orifice plate or bushing floor and stabilizes the heat pattern or temperature environment at the orifice plate or bushing floor facilitating easier restarting operations by an operator and reducing the time required for restarting.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of my invention will be described in connection with the accompanying drawings in which.

BEST MODE FOR CARRYING OUT THE INVENTION

Figure 1:
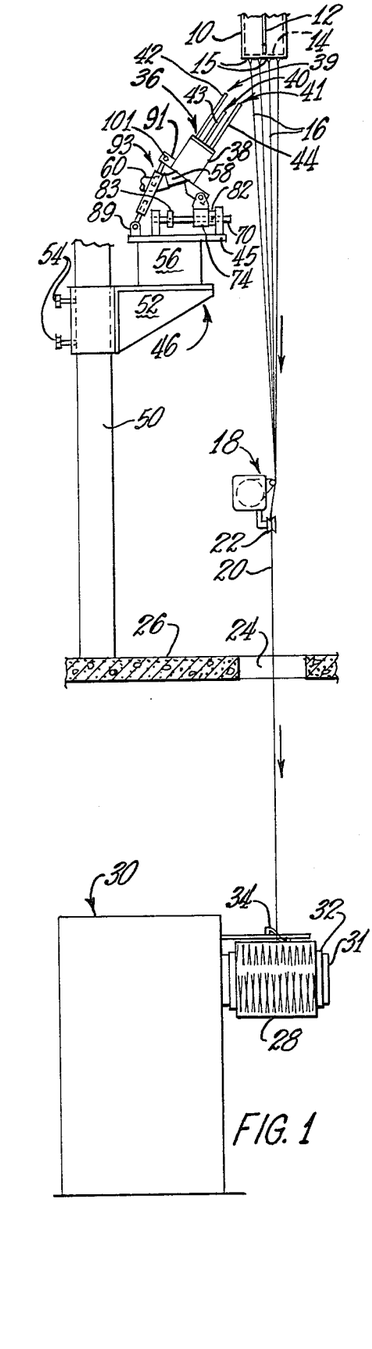
FIG. 1 is a side elevational view of an apparatus or arrangement for forming fibers or filaments attenuated from glass streams flowing from a stream feeder in combination with an adjustable or indexible nozzle construction for flowing air or other gas to the fiber or filament forming environment and stream flow region of the stream feeder.
Figure 2:
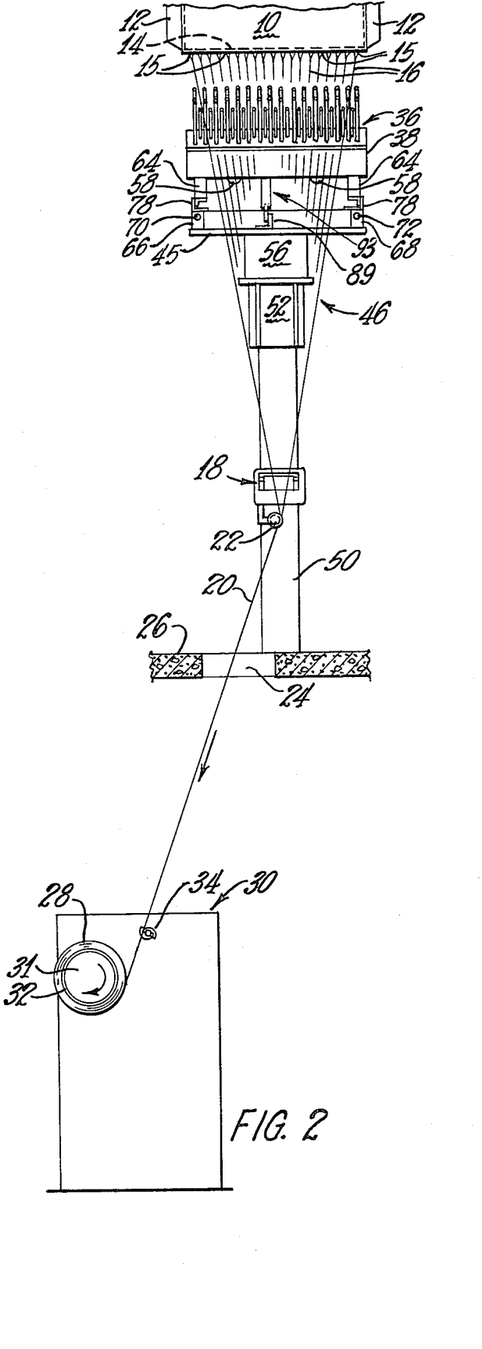
FIG. 2 is a front elevational view of the fiber-forming arrangement and nozzle construction shown in FIG. 1.

Referring to the drawings in detail and initially to FIGS. 1 and 2, a form of the construction or apparatus for flowing streams of glass and attenuating the streams to fine fibers or filaments and packaging the fibers or filaments is illustrated in association with an adjustable or indexible nozzle or gas blower construction for directing air or other gas into the fiber or filament-forming environment and onto an orifice plate, member or bushing floor from which flow the glass streams.

The apparatus or arrangement includes a stream feeder or bushing 10 secured to a conventional forehearth (not shown) connected with a melting furnace, molten glass from the furnace being conveyed by the forehearth into the stream feeder or bushing 10. The stream feeder or bushing is provided with terminals 12 which are connected with a source of electric energy for maintaining the glass in the feeder in a flowable condition.

The orifice plate, member or floor 14 of the stream feeder or bushing 10 is provided with very short depending projections 15 through which flow streams of glass. The orificed projections 15 are much shorter than conventional projections and are closely spaced to attain a high production of fibers or filaments for attenuation.

Air streams or streams of other gas are delivered to the fiber or filament-forming environment by means hereinafter described to render the glass streams of a viscosity suitable for attenuating the glass to continuous fibers or filaments 16. The attenuated fibers or filaments are coated by a conventional size or filament coating applicator 18 and are converged or gathered into a linear group or strand 20 by a gathering shoe 22.

The linear group or strand 20 passes through an opening 24 in a platform or intermediate floor 26 and is wound into a package 28 on a winding apparatus 30. The winding apparatus has a winding collet 31 mounted for rotation about a horizontal axis for collection of the strand into packages. A thin-walled collecting tube or forming tube 32 is placed on the collet for collection of the wound package on the tube.

A variable speed motor (not shown) within the housing of the winding apparatus 30 rotates the collet, and conventional winder speed controls modify the rotational speed of the collet during formation of the package, the collet being progressively reduced in speed as the package increases in size so that the attenuated fibers or filaments are maintained of a uniform diameter.

A strand traversing means 34 such as a spiral wire traverse of the character shown in U.S. Pat. No. 2,391,870 to Beach distributes the strand 20 lengthwise of the forming tube 32 in forming a package.

The orifices or orificed projections on the orifice plate or stream feeder floor are closely compacted. The control of the glass fiber or filament forming environment is maintained by the use of an air or gas blower means or nozzle construction 36.

One form of the blower means or nozzle construction is illustrated in FIGS. 1 through 4. The blower means or nozzle construction is inclusive of a chamber or manifold 38 of approximately the length of the bushing floor or orifice plate. The manifold or chamber 38 is provided with fluid flow orifices or outlets preferably in the form of tubes or nozzles which are arranged in rows lengthwise of the manifold or chamber 38.

Figure 3:
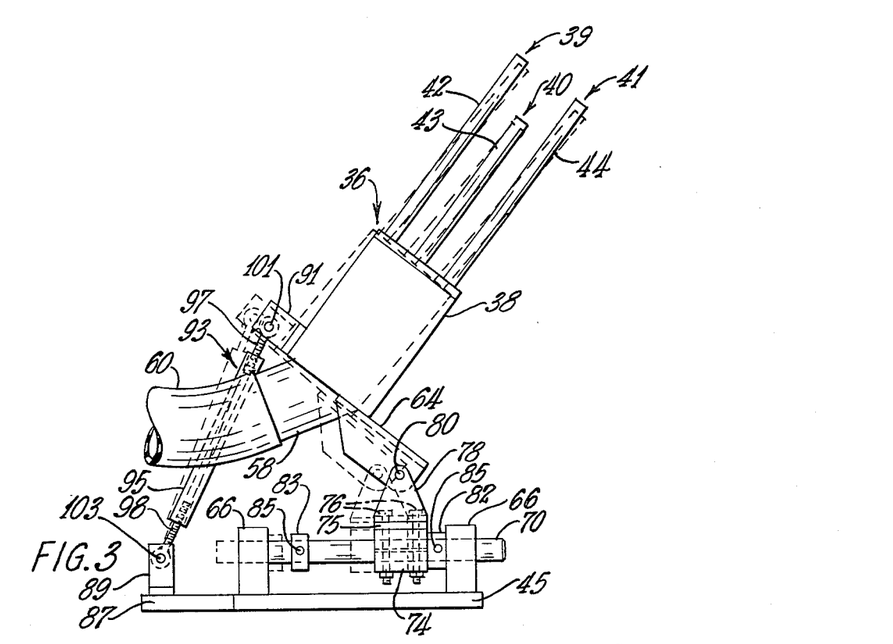
FIG. 3 is a side elevational view of a form of nozzle construction and adjustable or indexible mounting arrangement of the invention.
Figure 4:
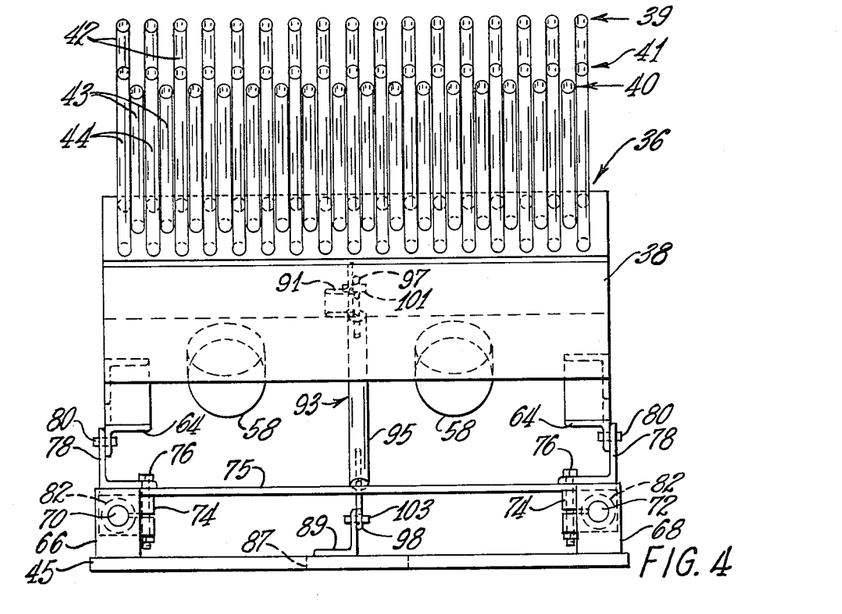
FIG. 4 is a front elevational view of the arrangement shown in FIG. 3.

As particularly shown in FIGS. 1, 3 and 4 the tubes or nozzles are preferably arranged in three rows, the rows being identified by numerals 39, 40 and 41. Nozzles 42 are arranged in row 39, nozzles 43 are arranged in the intermediate row 40, and nozzles 44 are arranged in row 41.

The nozzles of the three rows deliver streams of fluid such as air or other gas onto the glass stream flow area of the bushing floor or orifice plate 14. The open ends of the tubes or nozzles 42, 43 and 44 provide fluid delivery outlets.

The manifold or chamber 38 and the rows of nozzles or tubes are mounted for angular adjustment or indexing. The nozzles and the manifold or chamber 38 may be indexed to the position shown in FIGS. 1, 3 and 4 with the nozzles more nearly approaching a vertical position, this indexed position of the nozzles directing streams of air or other gas upwardly onto the stream flow area of the orifice plate or feeder floor during normal attenuating operations.

As hereinafter described, the manifold 38 and the rows of nozzles may be indexed to an increased angular position with respect to the normal fan-like path of attenuated filaments during an interruption of normal attenuating operations or in event of a filament or fiber break-out.

The increased angular position of the manifold and rows of nozzles when normal attenuation is interrupted by reason of the completion of a package or by reason of a fiber or filament break-out improves the heat stabilization or uniformity of temperature environment throughout the glass stream flow area of the orifice plate or feeder floor.

It should be noted that the nozzles 43 of the intermediate row 40 are of lesser length than the nozzles of the adjacent rows as it is found that reducing the length of nozzles of one of the rows improves the heat stabilization or temperature environment at the stream flow region of the orifice plate or stream flow area of the feeder floor during filament attenuation.

The manifold or chamber 38 and the rows 39, 40 and 41 of nozzles or tubes are mounted for angular adjustment or indexing and the components of the adjusting or indexing means including the chamber 38 and rows of nozzles are mounted upon a support means or base plate 45. FIGS. 1 and 2 illustrate a support arrangement or structural means 46 for supporting or mounting the base plate 45, the manifold and nozzle construction and indexing or adjusting means.

The support arrangement 46 is vertically adjustable to vary the distance of the nozzle construction below the bushing floor or orifice plate. The support arrangement 46 is inclusive of a vertically disposed post or structural member 50 mounted on the platform 26, an adjustable means or bracket 52 being mounted on the member 50.

The bracket 52 is provided with locking screws 54 for vertically adjusting the relative position of the nozzle construction 36 disposed below the stream feeder or bushing 10. A spacing block 56 is disposed between the base plate 45 and the bracket 52.

The chamber or manifold 38 is provided with two tubular air or gas inlet members 58 spaced lengthwise of the manifold or chamber as shown in FIGS. 2 and 4. Air or gas supply tubes 60, one of which is shown in FIGS. 1 and 3, are connected with a conventional blower to supply air or gas for delivery from the nozzles or tubes. The tubes or pipes 60 are of flexible material in order to accommodate adjustment or indexing movements of the chamber 38 and the nozzles.

The nozzle construction 36 is adjustably or articulately mounted so that the chamber 38 and the nozzles may be angularly adjusted or indexed with respect to the sliver fan of filaments whereby the fluid delivery ends or outlets of the tubes or nozzles remain substantially the same distances below the bushing floor or orifice plate in adjusted or indexed positions and without moving the delivery ends of the nozzles or tubes laterally with respect to the sliver fan.

In this manner the direction of the paths of the air or gas streams delivered from the nozzles may be varied while maintaining a substantially constant position for the delivery end of the nozzles or tubes.

Secured to a wall of the chamber 38 are brackets or members 64, the brackets being positioned at the end regions of the manifold or chamber 38. Mounted on the base plate or support member 45 is a first pair of upwardly extending members 66 and a second pair of members 68, one of the members 68 being shown in FIGS. 2 and 4. The pairs of members 66 and 68 are bored to slidably receive rods or shafts, one shaft 70 being mounted in bores in the pair of members 66, the other shaft 72 being mounted in the bores in the members 68.

Mounted on each of the shafts 70 and 72 is a block or clamp member 74. A connecting member or bridge 75 is engaged with the clamp members 74. Disposed adjacent each of the clamp members 74 above the connecting member 75 are L-shaped members 78. Each of the clamp members 74 is bored to receive securing bolts 76 which extend through openings in the members 78, the bridge or connecting member 75 and the clamp members 74. The bolts secure the members 78 and the connecting member 75 to the clamp members 74, the bolts clamping each of the members 74 on the shafts 70 and 72.

The overlapping portions of members 64 and 78 are bored to receive pivot pins 80 whereby the brackets or members 64 are articulately connected to the clamps or clamp members 74. It will be apparent from FIGS. 1 and 3 that by sliding the rods 74 relative to the stationary members 66 and the members 78 secured thereto that the nozzle construction 36 may be angularly adjusted or indexed to different angular positions.

Each of the shafts 70 and 72 is provided with abutments, stop members or collars 82 and 83 which may be adjusted lengthwise of the shafts 70 and 72 to limit the movements or indexing adjustments of the members 74 and the rods 70 and 72. Each of the collars or abutments 82 and 83 is equipped with a setscrew 85 to lock the abutments or collars in selected adjusted positions on the rods 70 and 72.

The nozzle construction or air blower 36 is articulately connected or anchored to the base plate or member 45. With particular reference to FIGS. 3 and 4, the base plate or member 45 is provided with a central extension 87 on which is securely mounted an L-shaped means, anchor member or projection 89. Secured to a central region of an exterior wall of the chamber or manifold 38 is an L-shaped means, member or projection 91.

Linkage means 93 is disposed between the projecting means or members 89 and 91. The linkage means in the embodiment illustrated is in the form of a turnbuckle construction comprising a tubular rod or sleeve 95 having interior left-hand threads at one end region and interior right-hand threads at the other end region.

Eyebolts 97 and 98 having right-hand and left-hand threads respectively are threaded into the end regions of the rod or sleeve 95. The eyebolt 97 is pivotally connected to the L-shaped member or projection 91 by a pivot pin 101, and the other eyebolt 98 is pivotally connected to the projection or L-shaped member 89 by a pivot pin 103.

With the adjustable member or indexing means 74 in the position shown in FIGS. 1 and 3, in engagement with the abutment or stop means 82 and the turnbuckle construction or linkage 93 adjusted as shown in FIGS. 1 and 3, the chamber or manifold 38 and the nozzles 42, 43 and 44 are at a particular angular position with respect to the sliver fan of filaments 16 shown in FIG. 1.

This position of the nozzle means and the manifold is utilized in attenuating fine filaments as the air or gas streams from the nozzles 42 more nearly approach a vertical direction so as to improve the stabilizing of the temperature environment over the area of the orifice plate or bushing floor so that glass streams of a substantially uniform viscosity may be attenuated into filaments of the same size or diameter. The more nearly vertical position of the nozzles results in a more stable temperature throughout the entire area of the bushing floor or orifice plate during the attenuation of fine fibers or filaments.

When winding of the strand of filaments into a package is completed and normal attenuation terminated, the streams of glass continue to flow by gravity and such forces cause the streams to move slowly downwardly and form coarse filaments which are very heavy. Such condition is usually referred to as a heavy sliver or "hanging" condition.

The resistance of the heavy sliver to the flow of the upwardly directed streams of air from the nozzles is greatly increased because the air is directed more nearly vertically from the nozzles. When a package of strand is completed or attenuation of the streams is otherwise interrupted and a "hanging" condition follows, the operator manually moves the members or indexing means 74 in a left-hand direction as viewed in FIGS. 1 and 3 bringing the abutments or stop means 83 into contact with the left-hand pair of stationary members 66 and 68 as shown in broken lines in FIG. 3.

The slidable movement of the members 74 and rods 70 and 72, through the pivotal connections 80 with the members 64, tilts the nozzle construction 36 including the manifold 38 and the nozzles or tubes to a greater angular position as shown in broken lines in FIG. 3 with respect to the sliver fan of filaments.

The linkage means 93 accommodates the angular movement of the nozzle construction to the second indexed position. The tilting movement of the nozzle construction to an increased angular position with respect to the vertical downwardly moving heavy sliver fan tilts the nozzles or tubes but does not materially change the relative position of the exits of the nozzles or tubes with respect to the sliver fan of filaments.

The increased angle enhances the movement of the air or gas streams from the nozzles 42, 43 and 44 to penetrate through the heavy sliver fan and stabilizes the temperature environment throughout the area of the orifice plate or bushing floor 14 so that a front area of the orifice plate or bushing floor remains at substantially the same temperature as the rear area of the orifice plate or bushing floor.

It should be noted that the mass or weight of the nozzle construction 36 is substantially balanced about the axis of the pivot pins 88 so that the members 74 in either of the indexed or adjusted positions will remain in either position as the mass or weight of the nozzle construction does not tend to transmit any force to the slidable members 74 to cause the nozzle construction to move away from either of its indexed positions.

The linkage means 93 facilitates the angular movement of the nozzle construction and provides means for angularly adjusting the nozzle construction without materially changing the position of the fluid delivery ends of the nozzles or tubes 42, 43 and 44. This is an important feature in that the angular adjustment of the nozzle construction does not move the discharge ends of the nozzles or tubes closer to the sliver fan of filaments.

While the angular adjustment from a right-hand to a left-hand position of the member 74, as viewed in FIG. 3, effects a slight downward movement of the discharge ends of the nozzles or tubes, the discharge ends do not move laterally toward the sliver fan of filaments.

In event of a filament break-out or interruption of flow of one or more of the glass streams, the operator interrupts winding of the package and moves the members 74 in a left-hand direction as viewed in FIGS. 1 and 3 engaging the stop members or abutments 83 with left-hand projections 66 and 68 thus tilting the nozzle construction 36 to a greater angular position with respect to the "hanging" fan of coarse filaments.

The increased angular position of the nozzle construction enables the air or gas streams from the nozzles to penetrate through the heavy "hanging" sliver of slowly falling filaments so that the temperature of the orifice plate or bushing floor during the hanging condition remains substantially constant throughout its area.

This condition reduces the handling time required in effecting a restart of the attenuating operation. While the amount of angular movement of the nozzle construction 36 may be regulated by adjusting the abutments or collars 82 and 83, it is found that the change in angularity may be in a range of two degrees and six degrees and is preferably about three degrees for the attenuation of most sizes of fine filaments.

While the nozzles 43 of the row 40 of nozzles are of lesser length than the rows of nozzles 42 and 44, the lengths of nozzles 43 may be varied. It is found that for most installations the nozzles 43 of the row of nozzles 40 may be about three-fourths of the length of the nozzles in the rows 39 and 41.

The velocity of air streams delivered from the nozzles or tubes is sufficient to effect heat stabilization at the orifice plate or stream feeder floor without disturbing the rapidly moving filaments attenuated from the glass streams. The air flow through the flexible tubes 60 and the air nozzle construction 36 may be controlled by conventional valve means (not shown).

Figure 5:
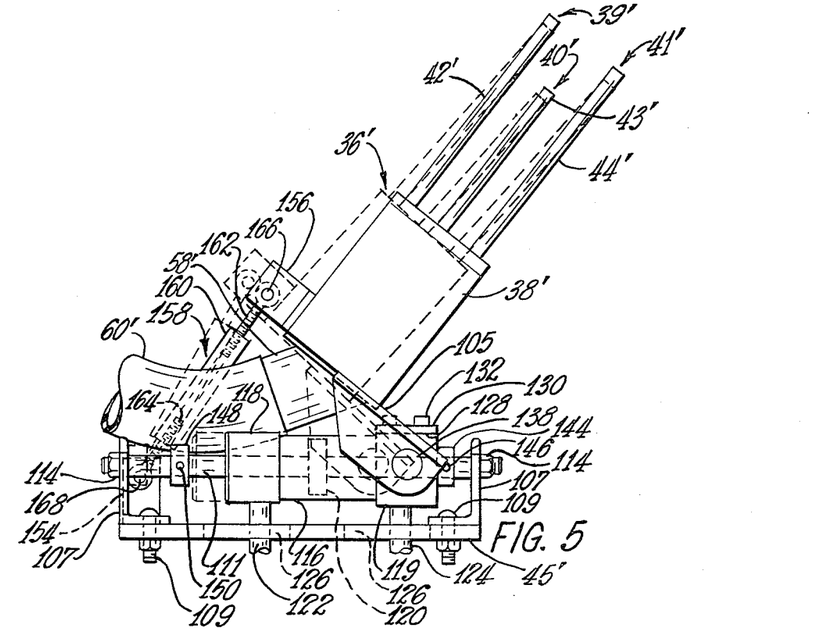
FIG. 5 is a side elevational view of the nozzle construction illustrating a power actuated indexing or adjusting means for the nozzle construction.
Figure 6:
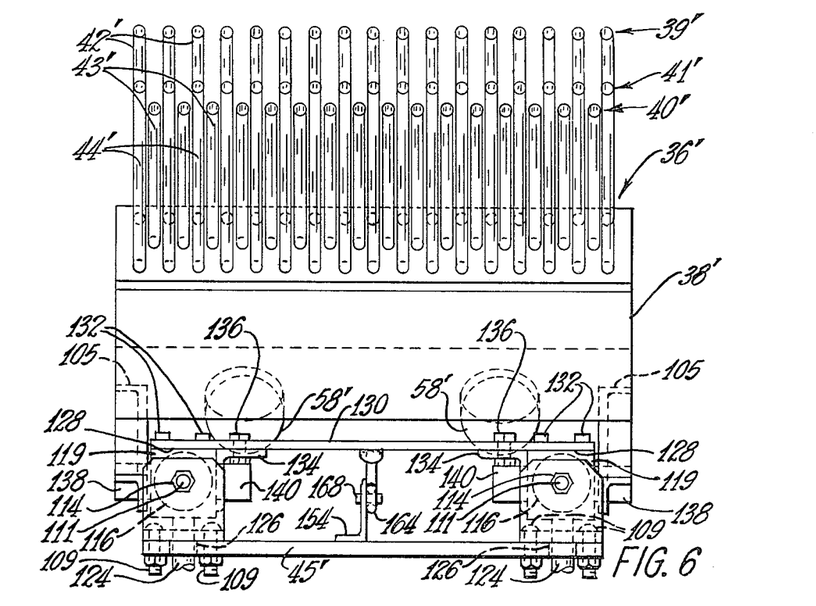
FIG. 6 is a front elevational view of the construction shown in FIG. 5.

FIGS. 5 and 6 illustrate a power means for adjusting our indexing the angular positions of a nozzle construction, the nozzle construction 36' being substantially the same as the nozzle construction 36 shown in FIGS. 1, 3 and 4. The nozzle construction 36' includes a manifold or chamber 38' from which extend three rows 39', 40' and 41' of nozzles. The nozzles 42' and 44' of the rows 39' and 41' are of substantially the same length as the nozzles 42 and 44 shown in FIG. 3, and the nozzles 43' of the row 40' are of substantially the same length as the nozzles 43 of the row 40 shown in FIG. 3.

The support means for the nozzle construction includes a base plate 45'. The base plate or member 45' is mounted upon a supporting structure 46 shown in FIGS. 1 and 2. The manifold or chamber 38' has two air or gas inlets or tubes 58' shown in FIG. 6. Flexible air or gas supply tubes 60', one of which is shown in FIG. 5, are connected with a blower (not shown) for delivery of air or gas from the nozzles 42', 43' and 44'.

Secured to a wall of the chamber or manifold 38' are L-shaped brackets or members 105. Mounted upon end regions of the base plate or support member 45' are L-shaped brackets 107 secured to the plate by bolts 109. The brackets are provided with openings to receive threaded end regions of rods 111 which receive securing nuts 114 to fixedly secure the rods to the members 107.

Slidably mounted on each of the rods 111 is a member or cylinder 116, the end heads 118 and 119 of the cylinders having packing (not shown) about the rods 111 so that air or gas pressure may be maintained in the cylinders. Fixedly secured to each of the rods within each of the cylinders 116 is a piston 120. Each piston rod 111 is stationary and the cylinders 116 are slidable along the rods.

Tubular means or members 122 and 124 of flexible material extend through elongated slots 126 in the plate or member 45' to accommodate slidable movement of the cylinders 116 along the rods 111. The piston rods 111 and the pistons 120 are stationary and the cylinders 116 are slidable along the rods by compressed air or other fluid under pressure alternately admitted through tubes 122 and 124 to the cylinders.

The pairs of tubes 122 and 124 are connected with a supply of compressed air through a conventional solenoid-operated valve means (not shown), the valve means being adapted to admit pressure through one pair of tubes while venting the pressure at the other side of the piston. In this manner the cylinders are moved in alternate directions.

Each end head 119 has an upper flat surface 128 and a connecting bar or bridge member 130 is connected to each end head 119 by securing bolts 132. By this means whenever the cylinders are moved along the rods 111, the cylinders move in unison.

Disposed adjacent the inner walls of the cylinder end heads 119 are L-shaped members 134 which are secured to the bar or member 130 by means of bolts 136. Each of the cylinder heads 119 is fashioned with laterally outwardly extending trunions or pins 138 and laterally inwardly extending trunions or pins 140.

The depending portions of the members 105 secured to the manifold or chamber 38' are provided with openings to receive the trunions or pins 138 extending outwardly from the cylinder heads 119. The depending portions of the L-shaped members 134 secured to the connecting member 130 are provided with openings to receive the trunions or pins 140 extending laterally and inwardly from the cylinder heads 119.

The openings in members 105 and 134 are slightly larger than the diameters of the trunions or pins so that longitudinal movement of the cylinders 116 along the rods 111 in adjusting or indexing the angular position of the nozzle construction 36' is attained with a minimum of frictional resistance.

Each of the rods 111 is provided with adjustable abutments, collars or stop means for limiting movement of the cylinders in each direction. Disposed at the right-hand of the cylinders 116 on the rods 111 are adjustable collars or abutments 114 equipped with setscrews 146 which collars or abutments may be adjusted to limit the movement of the cylinders 116 in a right-hand direction as viewed in FIG. 5 to position the nozzle construction 36' in a more nearly vertical position for attenuating fine filaments.

The rods 111 are provided with adjustable abutments, collars or stop means 148 equipped with setscrews 150, one of the collars or abutments being shown in FIG. 5. The abutments or collars 148 are disposed on the rods 111 at the left-hand ends of the cylinders 116 and may be adjusted to limit the left-hand movements of the cylinders 116 in indexing or positioning the nozzle construction in a greater angular position with respect to the vertically moving sliver fan of filaments when a package is completed or normal attenuation of filaments is otherwise interrupted.

The nozzle construction or air blower 36' is articulately connected or anchored to the base member 45'. Secured to the base plate or member 45' is an L-shaped member or means 154. Secured to a wall of the manifold 38' is an L-shaped member or projection 156. Linkage means 158 is provided for establishing an articulate connection between the members 154 and 156.

The linkage means 158 is in the form of a turnbuckle construction comprising a tubular rod or sleeve 160 having interior left-hand threads at one region and interior right-hand threads at another region. Eyebolts 162 and 164 have right-hand and left-hand threads respectively and are threaded into the threaded end regions of the rod or sleeve 160.

The eyebolt 162 is pivotally connected to the member 156 by a pin 166, and the eyebolt 164 is pivotally connected to the member 154 by a pin 168. A selected initial angular position of the nozzle construction 36' may be attained by adjusting the turnbuckle sleeve 160 and adjusting the relative position of the abutments or collars 144 adjacent the right-hand ends of the cylinders 116.

In the use of the nozzle construction 36' during normal filament attenuating operations the collars or abutment members 144 are adjusted on the rods 111 so that the end heads 119 of the cylinders 116 in engagement with the collars or abutments 144 determine the initial angular position of the nozzle construction 36' so as to direct the air from the nozzles 42' through the filament sliver to stabilize the temperature environment at the filament attenuating region and the temperature of the bushing or stream feeder floor or orifice plate so that the cooling effect of the air streams renders the glass flowing from the orifices at the proper attenuating temperature.

To attain this position of the cylinders 116, the valve means controlling the air flow into and away from the cylinders is actuated to admit air or other fluid under pressure through the tubular means 124 into the right-hand end regions of the cylinders 116 and the tubes 122 vented by the valve means.

Thus air or other fluid under pressure admitted into the right-hand ends of the cylinders as viewed in FIG. 5 exerts pressure between the stationary pistons 120 and the end heads 119 forcing the cylinders in a right-hand direction in engagement with the abutment members or stop means 144 thus establishing a normal position of the nozzle construction 36' more nearly vertical with respect to the downwardly moving attenuated filaments 16 for normal attenuating operations. This position of the nozzle construction 36' is shown in full lines in FIG. 5.

At the completion of a winding of a package or during a filament break-out attenuation is interrupted and the valve means is actuated to introduce air or other fluid under pressure through the tubes 122 into the cylinders 116 at the left-hand ends of the cylinders, the valve means also venting the air or fluid from the regions of the cylinders at the right-hand sides of the stationary pistons 120.

The pressure built up in the left-hand ends of the cylinders causes the cylinders to slidably move in a left-hand direction into engagement with the stop means 148 which have been adjusted to limit the left-hand movement of the cylinders and thereby increase the angularity of the nozzle construction 36' to a greater angular position with respect to the heavy filament sliver hanging from the stream feeder floor or orifice plate to secure more uniform thermal environment at the floor of the feeder or orifice plate when normal filament attenuation is interrupted. The chamber 38' and nozzle tubes 42' are thus moved to the position shown in broken lines in FIG. 5.

The articulate mounting arrangement for the nozzle construction 36' utilizing power means for adjusting or indexing the nozzle construction enables the shifting or indexing of the nozzle construction by manipulation of a valve means which may be disposed at any position such as a control panel remote from the nozzle construction.

It is to be understood that other types of power means may be utilized with the articulated mounting arrangement of the nozzle construction for securing different angular positions of the nozzle construction without moving the exit ends of the nozzle tubes closer to the hanging filaments during interruption of normal filament attenuating operations.

The nozzle construction is disposed below the floor of the stream feeder or orifice plate at a distance to secure a stable temperature environment and is preferably in a range of from four inches to twelve inches below the feeder floor or orifice plate. Through the use of the power-actuated adjusting means for the nozzle construction the angular positions for the nozzle construction may be varied by adjusting the abutments or stop means to attain the most efficient use of the air or gas streams in stabilizing the temperature at the filament attenuating region and the bushing floor or orifice plate.

In the forms of the invention illustrated the mass or weight of the nozzle construction is balanced with respect to the articulate mounting means so that the nozzle construction will remain in adjusted positions when there is no fluid pressure at eigher side of the pistons 120 in the cylinders 116.

The invention of establishing a stable temperature environment for a fiber or filament attenuating operation is particularly usable with a stream feeder floor or an orifice plate having very short depending projections with orifices in the projections where the projections are closely spaced or compacted.

The method and apparatus may be used for controlling temperature environment at a stream feeder floor or orifice plate wherein the orifices are closely spaced or compacted and without any depending projections. In the use of an orifice plate or stream feeder floor having very short compacted depending projections, the projections may be of a length in a range of one sixty-fourth of an inch (0.397 millimeters) to one-eighth of an inch (3.175 millimeters).

It is apparent that, within the scope of the invention, modifications and different arrangements may be made other than as herein disclosed, and the present disclosure is illustrative merely, the invention comprehending all variations thereof.

I claim:

1. In combination with a fiber-forming apparatus wherein streams of heat-softened mineral material flowing from a stream feeder are attenuated to fibers, a chamber adapted to contain a fluid, said chamber having outlet means for delivering fluid from the chamber, relatively movable means supporting the chamber, said relatively movable means in one position effecting delivery of fluid from the chamber through the outlet means into the attenuating zone during normal fiber-forming operations, said relatively movable means being movable to a second position changing the angular position of the chamber and direction of flow of the fluid upon interruption of normal fiber-forming operations while maintaining the outlet means in substantially the same position relative to the stream feeder.

2. The combination according to claim 1 including power means for moving the relatively movable means.

3. In combination with a glass filament-forming apparatus wherein glass streams flowing from a stream feeder are attenuated to filaments, a chamber adapted to contain a fluid, said chamber having outlet means for delivering fluid from the chamber into the attenuating zone and onto the stream flow region of the feeder, relatively movable means connected with the chamber, relatively stationary means, linkage means connected with the chamber and with the relatively stationary means, said relatively movable means being movable to selected positions for varying the angular position of the chamber while the relatively movable means and the linkage means maintain the outlet means in substantially the same position relative to the stream feeder.

4. The combination according to claim 3 including power means for moving the relatively movable means and the linkage means.

5. In combination with a glass filament-forming apparatus wherein glass streams flowing from a feeder are attenuated to filaments, a manifold, means supplying a fluid to the manifold, said manifold having outlet means for delivering streams of fluid from the manifold into the attenuating zone, support means, a member movably mounted by the support means, said manifold being connected with the movable member, linkage means connected to the manifold, said linkage means being connected with the support means, said movably mounted member and linkage means in one position being effective to deliver fluid from the chamber into the attenuating zone during normal filament-forming operations, said member and linkage means being movable to a second position changing the angular position of the manifold and direction of flow of the fluid upon interruption of normal filament-forming operations while maintaining the outlet means in substantially the same position relative to the glass stream feeder.

6. In combination with a glass filament-forming apparatus wherein glass streams flowing from a feeder are attenuated to filaments, a manifold, means supplying a fluid to the manifold, said manifold having outlet means for delivering streams of fluid from the manifold into the attenuating zone and onto the stream flow region of the feeder, support means, a member slidably mounted by the support means, said manifold being articulately connected with the slidable member, linkage means connected to the manifold, said linkage means being connected with the support means, said slidable means and linkage means being movable to selected positions for varying the angular position of the manifold while maintaining the outlet means in substantially the same position relative to the glass stream feeder.

7. In combination with a glass filament-forming apparatus wherein glass streams flowing from a feeder are attenuated to fine filaments, a manifold, means supplying air to the manifold, said manifold having tubular nozzles having outlets for delivering streams of air from the manifold into the attenuating zone and onto the stream flow region of the feeder, support means, relatively movable means mounted by the support means, said movable means being pivotally connected with the manifold, linkage means pivotally connected with the manifold, said linkage means being connected with the support means, said movable means and linkage means being movable to selected positions for varying the angular position of the manifold and the tubular nozzles while maintaining the nozzle outlets in substantially the same position relative to the glass stream feeder.

8. In combination with a glass filament-forming apparatus wherein glass streams flowing from a feeder are attenuated to fine filaments, a manifold, means supplying a gas to the manifold, said manifold having outlet means for delivering streams of gas from the manifold into the attenuating zone and onto the stream flow region of the feeder, support means, a pair of transversely spaced movable members mounted by the support means, said members being articulately connected with the manifold, linkage means connected with the manifold and with the support means, said members and linkage means being movable to selected positions for changing the angular position of the manifold while maintaining the outlet means in substantially the same position relative to the glass stream feeder.

9. The combination according to claim 8 including power means for moving the members.

10. In combination with a glass filament-forming apparatus wherein glass streams flowing from a feeder are attenuated to fine filaments, a manifold, means supplying a gas to the manifold, a plurality of tubular nozzles supported by the manifold having outlets for delivering streams of gas from the manifold into the attenuating zone and onto the glass stream flow region of the feeder, support means, a pair of transversely spaced members slidably mounted on the support means, said members being articulately connected with the manifold, linkage means connected with the manifold and with the support means, said slidable members being movable to selected positions actuating the linkage means for changing the angular position of the manifold and the nozzles while maintaining the outlets of the nozzles in substantially the same position relative to the glass stream feeder.

11. The combination according to claim 10 including abutment means for limiting movements of the slidable members.

12. In combination with a glass filament-forming apparatus wherein glass streams flowing from a feeder are attenuated to fine filaments, a manifold, means supplying a gas to the manifold, a plurality of tubular nozzles supported by the manifold having outlets for delivering streams of gas from the manifold into the attenuating zone and onto the glass stream flow region of the feeder, support means, linkage means connected with the manifold and with the support means, fluid actuated power means for changing the angular position of the manifold and the nozzles, said power means including a cylinder member and a piston rod member equipped with a piston, one of said members being pivotally connected to the manifold whereby fluid under pressure admitted into the cylinder member moves one of said members and the linkage means for changing the angular position of the manifold and the nozzles while maintaining the outlets of the nozzles in substantially the same position relative to the glass stream feeder.

13. In combination with a glass filament-forming apparatus wherein glass streams flowing from a feeder are attenuated to fine filaments, a manifold, means supplying a gas to the manifold, a plurality of tubular nozzles supported by the manifold having outlets for delivering streams of gas from the manifold into the attenuating zone and onto the glass stream flow region of the feeder, support means, linkage means connected with the manifold and with the support means, power means for changing the angular position of the manifold and the nozzles, said power means including a pair of cylinder members, a pair of piston rod members equipped with pistons for the cylinder members, said manifold being pivotally connected with one pair of the members whereby fluid pressure admitted into the cylinder members moves the said pair of members connected with the manifold and the linkage means for changing the angular position of the manifold and the nozzles while maintaining the outlets in substantially the same position relative to the glass stream feeder.

14. In combination with a glass filament-forming apparatus wherein glass streams flowing from a feeder are attenuated to fine filaments, a manifold, means supplying air to the manifold, a plurality of nozzles supported by the manifold having outlets for delivering streams of air from the manifold into the attenuating zone and onto the glass stream flow region of the feeder, support means, linkage means connected with the manifold and with the support means, power means for changing the angular position of the manifold and the nozzles, said power means including a pair of relatively stationary piston rods equipped with pistons, a cylinder slidably mounted on each of the piston rods, each of said cylinders being articulately connected with the manifold whereby fluid pressure admitted into the cylinders moves the cylinders and the linkage means for changing the angular position of the manifold and the nozzles while maintaining the outlets in substantially the same position relative to the glass stream feeder.

15. In combination with a glass filament-forming apparatus wherein glass streams flowing from a feeder are attenuated to filaments, a manifold, means supplying a fluid to the manifold, said manifold having outlets for delivering streams of fluid from the manifold into the attenuating zone and onto the stream flow region of the feeder, support means, relatively movable means mounted by the support means, said movable means being pivotally connected with the manifold, linkage means connecting the manifold with the support means, said linkage means including an adjustable turnbuckle construction wherein one threaded component of the turnbuckle construction is pivotally connected with the manifold and another threaded component pivotally connected with the support means, said movable means and linkage means being movable to a position modifying the path of the fluid delivered from the outlets while maintaining the outlets in substantially the same position relative to the stream feeder.

16. In combination with a glass filament-forming apparatus wherein glass streams flowing from a feeder are attenuated to fine filaments, a chamber having an inlet means adapted to convey fluid into the chamber, said chamber having outlet means for delivering fluid from the chamber into the attenuating region and onto the stream flow region of the feeder, mounting means for the chamber including a relatively movable member, an articulate connection between the chamber and the relatively movable member, a relatively stationary member, linkage means connected with the chamber and with the relatively stationary member, said relatively movable member in one position directing fluid from the outlet means in one path into the attenuating environment and onto the stream flow region of the feeder, said relatively movable member being movable to a second position upon interruption of normal filament attenuation shifting the chamber to a different angular position to modify the path of the fluid delivered from the outlet means while maintaining the outlet means in substantially the same position relative to the stream feeder.

17. In combination with a glass filament-forming apparatus wherein glass streams flowing from a stream feeder means are attenuated to filaments, a chamber having an inlet means adapted to convey fluid into the chamber, said chamber having tubular nozzles provided with outlets for delivering fluid from the chamber, a supporting structure for the chamber including relatively movable means, said chamber being articulately connected with the relatively movable means, a relatively stationary member, linkage means articulately connecting the chamber with the relatively stationary member, said relatively movable means and linkage means in one position directing fluid from the outlets of the nozzles in one direction into the attenuating environment and onto the stream flow region of the feeder means, said relatively movable means and linkage means being movable to a second position upon interruption of normal filament-forming operations shifting the chamber and nozzles to a different angular position to modify the direction of flow of the fluid delivered from the outlets of the nozzles while maintaining the outlets of the nozzles in substantially the same position relative to the stream feeder means.

18. In combination with a glass filament-forming apparatus wherein glass streams flowing from a feeder are attenuated to filaments, a manifold, means supplying a gas to the manifold, a plurality of tubular nozzles having outlets, the nozzles being supported by the manifold, said tubular nozzles arranged in rows lengthwise of the manifold, the nozzles of one row being of lesser length than the nozzles of an adjacent row, relatively movable means and linkage means connected with the manifold, said relatively movable means and linkage means in one position directing gas from the outlets of the tubular nozzles into the filament attenuating zone and onto the stream flow region of the feeder, said relatively movable means and linkage means being movable to a second position upon interruption of normal filament attenuating operations for changing the angular position of the manifold and the tubular nozzles for modifying the direction of flow of gas from the outlets of the nozzles while maintaining the outlets in substantially the same position relative to the stream feeder.

19. The combination according to claim 18 including power means for moving the relatively movable means and linkage means.

20. In combination with a glass filament-forming apparatus wherein glass streams flowing from a feeder are attenuated to filaments, a manifold, means supplying a gas to the manifold, a plurality of tubular nozzles having outlets, the nozzles being supported by the manifold, said tubular nozzles arranged in three rows lengthwise of the manifold, the nozzles of the intermediate row being of lesser length than the nozzles of the other two rows, relatively movable means connected with the manifold, said relatively movable means in one position directing gas from the outlets of the tubular nozzles into the filament attenuating zone and onto the stream flow region of the feeder, said relatively movable means being movable to a second position upon interruption of normal filament attenuating operations for changing the angular position of the manifold and the tubular nozzles for modifying the direction of flow of gas from the nozzles while maintaining the outlets in substantially the same position relative to the stream feeder.

21. The method of forming filaments from heat-softened mineral material including flowing streams of the material from orifices in a feeder, attenuating the streams of material to filaments, delivering gas streams from outlets of nozzles upwardly into contact with the streams of mineral material and the orificed region of the feeder during normal attenuating operations in an amount to convey away sufficient heat to render the material of the streams attenuable and stabilize the temperature environment at the stream flow region of the feeder, and upon interruption of an attenuating operation changing the angularity of the nozzles and thereby changing the angularity of flow of the upwardly directed gas streams relative to the filaments while maintaining substantially constant the positions of the outlets for delivery of the gas streams with respect to the path of movement of the filaments normally attenuated from the streams of material.

22. The method of forming filaments from heat-softened glass including flowing streams of glass from orifices in a feeder, attenuating the streams to filaments by winding a group of the filaments into a package, delivering streams of air from outlets of nozzles upwardly during normal attenuating operations into contact with the streams of glass and the orificed region of the feeder in an amount to convey away sufficient heat to render the glass of the streams attenuable and stabilize the temperature environment at the stream flow region, and upon interruption of an attenuating operation increasing the angularity of the nozzles and thereby increasing the angularity of the upwardly directed streams of air relative to the normal path of movement of the filaments while maintaining substantially constant the positions of the outlets of the nozzles for the delivery of the air with respect to the path of movement of the filaments attenuated from the streams.

23. The method of forming filaments of glass including flowing glass streams from orifices in a feeder, attenuating the streams to filaments, directing streams of air upwardly from outlets of nozzles during normal attenuating operations into contact with the streams of glass and the orificed region of the feeder in an amount to convey away sufficient heat to render the glass of the streams attenuable and stabilize the temperature environment at the stream flow region, and upon interruption of an attenuating operation modifying the angularity of the nozzles thereby modifying the flow path of the directed air streams while maintaining substantially constant the position of the outlets of the nozzles relative to the glass stream feeder.

24. The method of forming filaments from heat-softened glass including flowing streams of glass from orifices in a feeder, attenuating the streams to filaments by winding a group of the filaments into a package, delivering streams of air upwardly from outlets of nozzles into contact with the streams of glass and the orificed region of the feeder in an amount to convey away sufficient heat to render the glass of the streams attenuable and stabilize the temperature environment at the stream flow region, and upon interruption of attenuation of the glass streams changing the angularity of the nozzles and thereby changing the angularity of the upwardly directed air streams while maintaining the outlets of the nozzles in substantially the same position relative to the feeder to stabilize the heat pattern at the glass stream flow region of the feeder.

* * * * *